United States Patent [19]

Namba et al.

[11] 4,450,803
[45] May 29, 1984

[54] INTERNAL COMBUSTION ENGINE

[75] Inventors: Yuzuru Namba; Kenichi Aoyagi; Hiroshi Yokoyama, all of Hamamatsu, Japan

[73] Assignee: Suzuki Kogyo Kabushiki Kaisha, Shizuoka, Japan

[21] Appl. No.: 289,700

[22] Filed: Aug. 3, 1981

[30] Foreign Application Priority Data

Aug. 13, 1980 [JP] Japan ............................. 55-111351
Sep. 29, 1980 [JP] Japan ............................. 55-135606
Sep. 29, 1980 [JP] Japan ............................. 55-135607

[51] Int. Cl.³ ............................................. F02B 31/00
[52] U.S. Cl. ................................. 123/308; 123/52 MB
[58] Field of Search ............... 123/308, 432, 188 M, 123/52 MB

[56] References Cited

U.S. PATENT DOCUMENTS

| | | | |
|---|---|---|---|
| 3,977,188 | 8/1976 | Arnaud | 123/432 |
| 4,072,136 | 2/1978 | Noguchi et al. | 123/432 |
| 4,292,944 | 10/1981 | Matsumoto et al. | 123/308 |

FOREIGN PATENT DOCUMENTS

| | | | |
|---|---|---|---|
| 54-13807 | 2/1979 | Japan | 123/432 |
| 54-103913 | 8/1979 | Japan | 123/308 |
| 55-93922 | 7/1980 | Japan | 123/308 |

*Primary Examiner*—Craig R. Feinberg
*Assistant Examiner*—W. R. Wolfe
*Attorney, Agent, or Firm*—Quaintance & Murphy

[57] ABSTRACT

An internal combustion engine which devises the opened direction and position of the gas outlet end of a sub-suction path provided separately from a main suction path so as to inject a gas in the circumferential direction of a combustion chamber during the suction stroke, in which the outlet end of the sub-suction path opens within such a range that, in a plane normal to the axis of the cylinder, the line extending in an opened direction of the sub-suction path is at an angle of ±20 to 110 degrees with respect to the line joining the center of the suction port and the axis of the cylinder; the distance between the outlet end of the sub-suction path and the face of a suction valve at its closed position is not more than the internal diameter of the main suction path; or the outlet end of the sub-suction path is positioned within a sphere with its center being a spark point of an ignition plug and with the same diameter as the internal diameter of the cylinder and within a range of ±1 mm from the plane which contains both the center line of the stem of the intake valve and such one of the points of tangency between the valve facing circle of the valve seat of the suction valve and the lines drawn from the spark joint of the ignition plug as is nearer to the wall of the cylinder.

1 Claim, 21 Drawing Figures

INTERNAL COMBUSTION ENGINE

BACKGROUND OF THE INVENTION

1. Field of the Invention

The present invention relates to an internal combustion engine which is intended to reduce the noxious content of the exhaust gas, especially, nitrogen oxides ($NO_x$) and to improve the mileage.

2. Description of the Prior Art

Recently, in an internal combustion engine for automobiles, not only the purification of the exhaust gas but also the improvement in the rate of fuel consumption are required. For these requirements, an EGR (exhaust gas recirculation) and a lean combustion are frequently performed. In order to prevent the combustion fluctuations and the misfire while satisfying both the requirements for the safety EGR and the lean combustion, it is known that it's preferable to increase the burning velocity.

In order to raise this burning velocity, there have been recently proposed several suction systems, in which a sub-suction path provided separately from a main suction path is designed to inject a gas into a combustion chamber, thereby generating a swirl of the suction gas in the combustion chamber.

However, the suction system provided with such a sub-suction path is in a transient range to the practical use and has much to depend upon the future investigation. In the conventional suction system, indeed, since the intensity of the swirl generated is not sufficient, there arises a limit to the lean combustion and considerable improvement in the rate of fuel consumption cannot be expected, if the heavy EGR is performed while taking preference of measures for the exhaust emission control, especially, the reduction in the $NO_x$ emission.

SUMMARY OF THE INVENTION

It is, therefore, an object of the present invention to provide an internal combustion engine which can enable a heavy EGR and lean combustion for the purposes of improvement in rate of fuel consumption and reduction in the noxious gas emission by the strong swirl generation through a sub-suction path provided separately from a main suction path.

Specifically, it is an object of the present invention to provide an internal combustion engine, in which the opened direction of the outlet end of a sub-suction path is set within such a range that, in a plane normal to the axis of the cylindrer, the line extending in an opened direction of a sub-suction path is at an angle of ±20 to 110 degrees with respect to the line joining the center of a suction port and the axis of an engine cylinder, whereby a more intense swirl in the suction gas can be generated to enhance the limit of the lean combustion.

Another object of the present invention is to provide an internal combustion engine, in which the distance between the outlet end of a sub-suction path and the face of an suction valve at its closed position (a valve facing circle of a valve seat of the suction valve) is made not more than the internal diameter of a main suction path, whereby a more intense swirl in the suction gas can be generated to raise the limit of the lean combustion.

Still another object of the present invention is to provide an internal combustion engine, in which the outlet end of a sub-suction path is positioned within a sphere with its center being the spark point of an ignition plug and with the same diameter as the internal diameter of the cylinder and within a range of ±1 mm from a plane which contains both the center line of a stem of a suction valve and such one of the contacts of tangency between a valve facing circle of a valve seat of a suction valve and a lines drawn from the spark point of the ignition plug as is nearer to the wall of the cylinder, whereby a more intense swirl of the suction gas can be generated to enhance the limit of the lean combustion.

DESCRIPTION OF THE PREFERRED EMBODIMENTS

Figure 1:
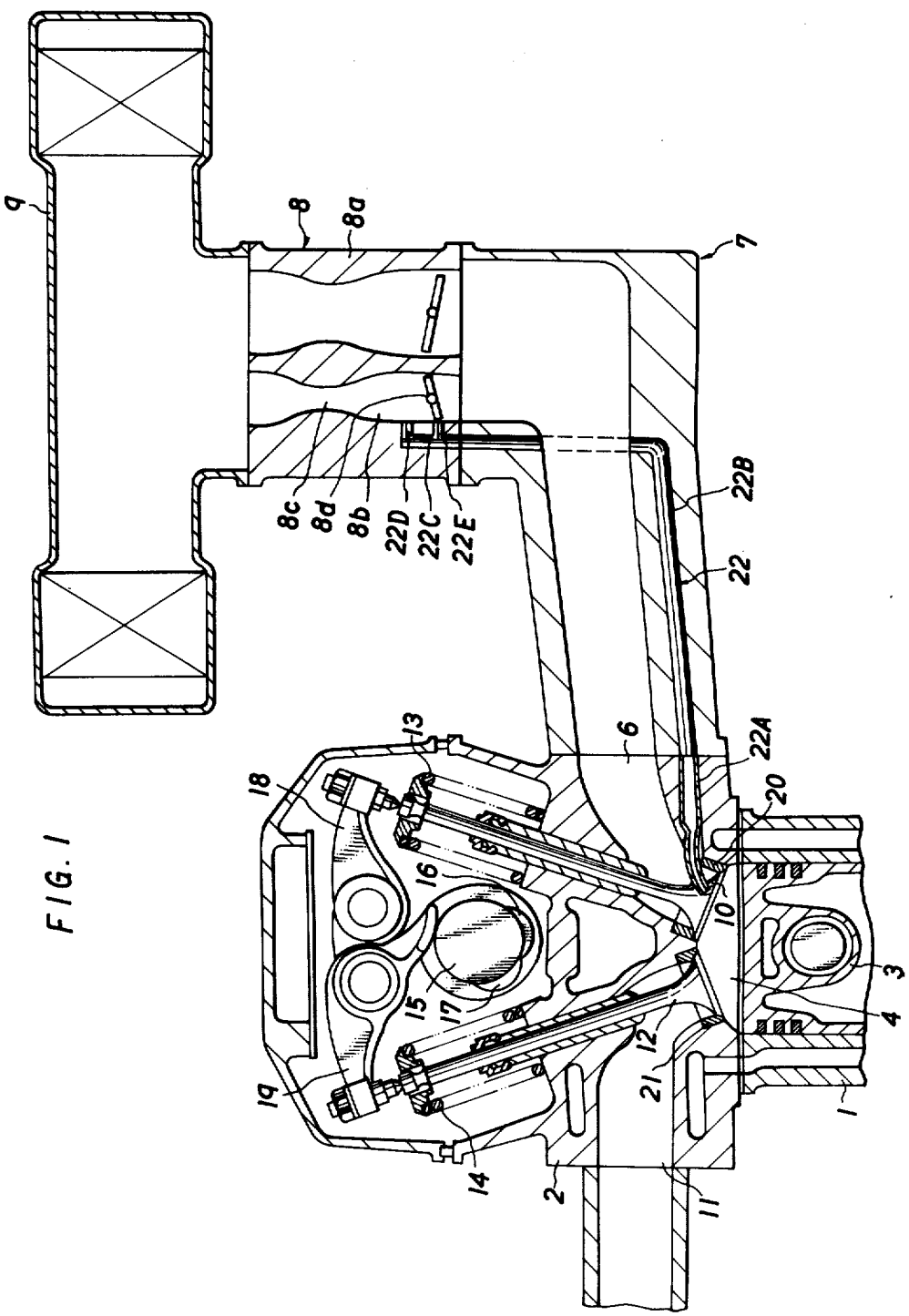
FIG. 1 is a sectional view showing one embodiment of the present invention.

The present invention will now be described in connection with the embodiments thereof with reference to the accompanying drawings. In FIG. 1, reference numerals 1 and 2 indicate a cylinder and a cylinder head, respectively. Numeral 3 indicates a piston which is fitted in the cylinder 1. Numeral 4 indicates a combustion chamber which is defined by those engine components 1, 2 and 3 and into which a main suction path 5 is opened. Thus main suction path 5 is constructed as a passage which leads from an suction port 6 formed in the cylinder head 2 via a suction manifold 7 and a two-barrel carburetor 8 acting as a fuel supply device to an air cleaner 9.

The outlet end of the suction port 6, i.e., the open end opened into the combustion chamber 4 is equipped with an suction valve 10, by which the suction port 6 is opened or closed. On the other hand, an exhaust port 11 formed in the cylinder head 2 is opened or closed by an exhaust valve 12. Both the aforementioned two valves 10 and 12 are controlled by the action of an opening control mechanism, which is constructed by return springs 13 and 14, cams 16 and 17 and rocker arms 18 and 19 which are to be driven by a cam shaft 15 and so on so that they are seated upon their respective valve seats 20 and 21 when they are closed.

Reference numeral 22 indicates a sub-suction path which has a smaller effective opening area than that of the main suction path 5. The sub-suction path 22 is constructed of: a pipe member 22A which is press-fitted in the cylinder head 2 thereby to constitute the outlet end portion of the sub-suction path; a passage portion 22B which is formed in the suction manifold; a passage portion 22C which is formed in the body 8a of the carburetor 8; and two inlet ends 22D and 22E which are branched from the passage portion 22C and which are respectively opened into the primary passage portion 8b of the carburetor 8. Both the two inlet ends 22D and 22E are spaced in the flow direction of the passage portion 8b. Specifically, the upstream side inlet end 22D is opened between a primary venturi portion 8c and a primary throttle valve 8d of the carburetor 8 whereas a downstream side inlet end 22E is opened at such a position as is closed by the primary throttle valve 8d at its closed (i.e, idling) position.

Figure 2:
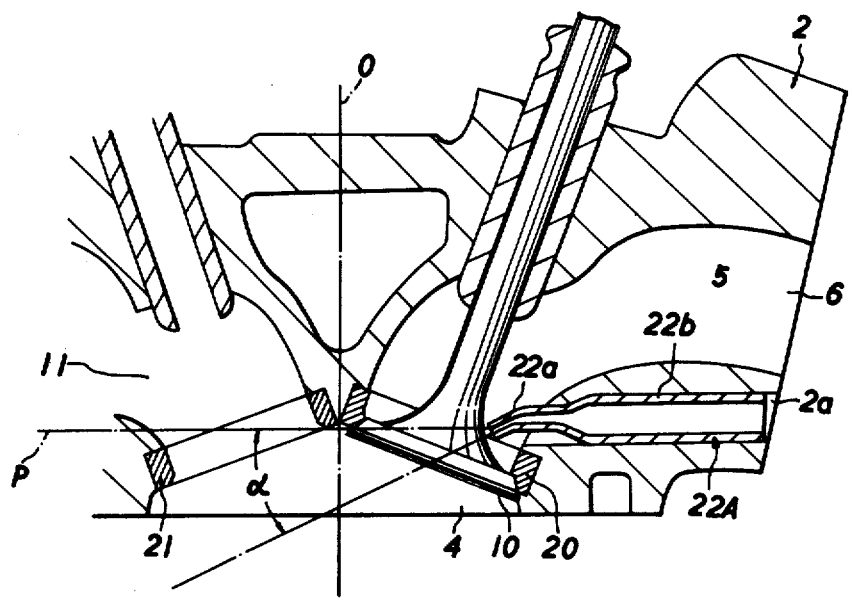
FIG. 2 is an enlarged sectional view showing an essential portion of FIG. 1.

On the other hand, as shown also in FIG. 2 the pipe member 22A constituting the outlet end portion (i.e., the end portion at the side of the combustion chamber 4) of the sub-suction path 22 has an injection nozzle portion 22a with a reduced diameter which is fitted in the cylinder head 1 such that it is opened to protrude into the suction port 6 upstream of the suction valve 10. On the other hand, the remaining base end portion of the pipe member 22A forms a bore portion 22b which is press-fitted in a fitting hole 2a formed in the cylinder head 2. This fitting hole 2a has its on end opened into the suction port 6 and its other end opened into the fitting side of the suction manifold 7. The pipe member 22A may be forced into the fitting hole 2a from the suction manifold fitting side. Moreover, the injection nozzle portion 22a of the pipe member 22A thus constructed is designed to generate a swirl of the suction gas on the axis of the cylinder 1 in the combustion chamber 4 when a gas is injected from the nozzle. The oriented direction of the injection nozzle portion 22a is so set as to generate an intense swirl of the suction gas, as will be described hereinafter.

Figure 3:
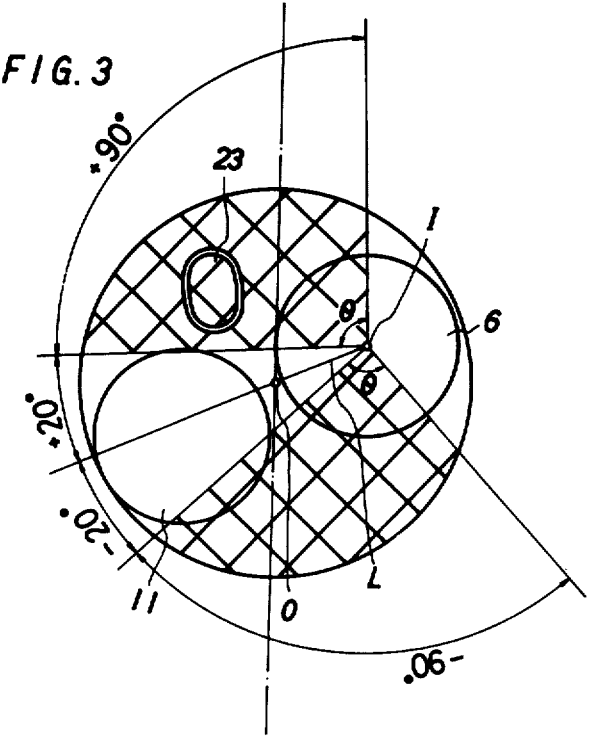
FIGS. 3 to 5 and FIG. 8 are schematic views showing the opened direction of the outlet end of a sub-suction path, as viewed from the inside of a cylinder head.
Figure 4:
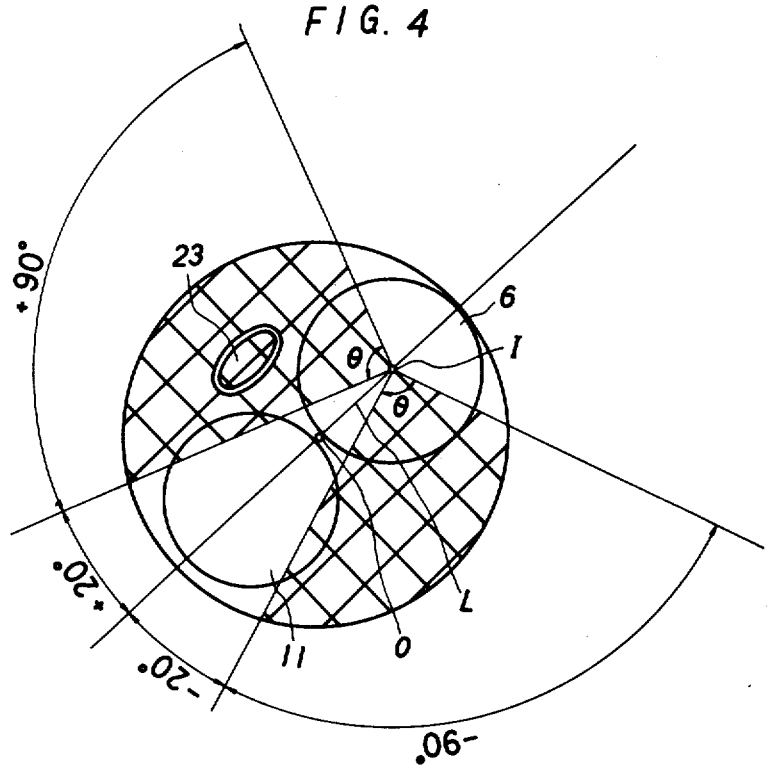
Figure 5:
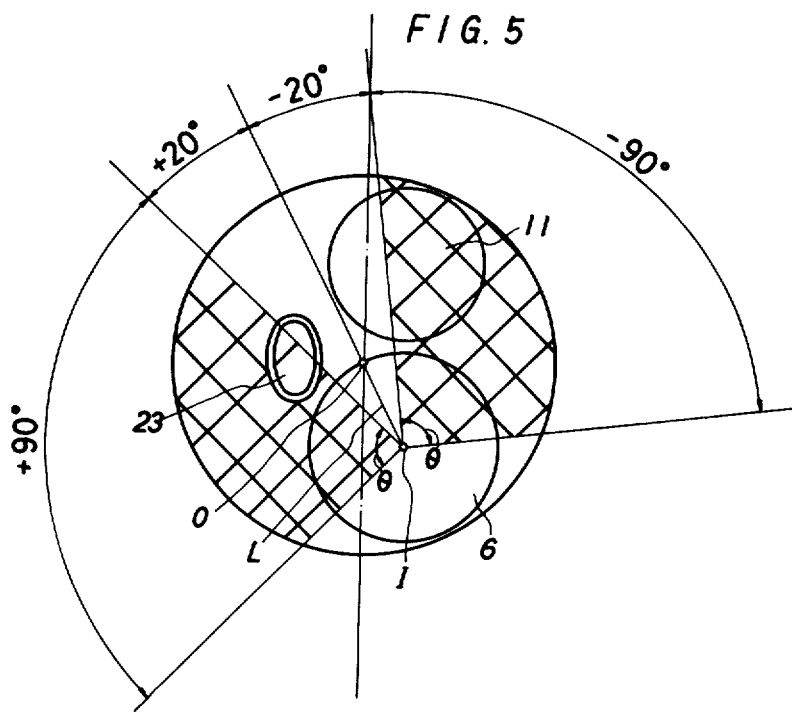

Here, the oriented direction of the aforementioned injection nozzle portion 22a as a first embodiment i.e., the opened direction of the outlet end of the sub-suction path 22 will be described in detail with reference to FIG. 3. Now, the axis of the cylinder 1 is denoted at 0, the center of the portion of the suction port 6, which is opened into the combustion chamber 4, is denoted at I, and the line joining those two centers if denoted as L. In a plane P (which should be referred to FIG. 2) normal to the axis 0 of the cylinder 1, the injection nozzle portion 22a is directed such that the projected line on this plane of the line extending through the aforementioned center I is at an angle of ±20 to 110 degrees with respect to the joining line L. The direction range thus defined is represented by a central angle $\theta$ and illustrated by a fretwork in FIG. 3. On the other hand, FIGS. 4 and 5 illustrate the arrangements which are slightly different in the positional relationships of the suction and exhaust ports 6 and 11 and an ignition plug 23 from that of FIG. 3. Nevertheless, the oriented direction of the injection nozzle portion 22a is similar to that shown in FIG. 3.

Incidentally, the exhaust gases is recirculated from the exhaust path 22 via an EGR valve into either the main suction path 5 or the sub-suction path 22. Nevertheless, the constructions of the EGR path and the EGR valve can be made same as or similar to those of the prior art, and therefore, explanation thereof are omitted.

In the internal combustion engine having the construction thus far described, during the suction stroke having the suction valve 10 opened, the combustion chamber 4 is supplied with an air-fuel mixture from the main suction path 5, whereas a gas (e.g., the air or its mixture) is injected (or sucked) from the sub-suction path 22 into the combustion chamber 4 through the clearance between the suction valve 10 and the valve seat 20. By the injection of the gas from that sub-suction path 22, the mixture sucked into the combustion chamber 4 is supplied with swirl around the axis of the cylinder 1 so that the burning velocity may be accelerated.

Figure 6:
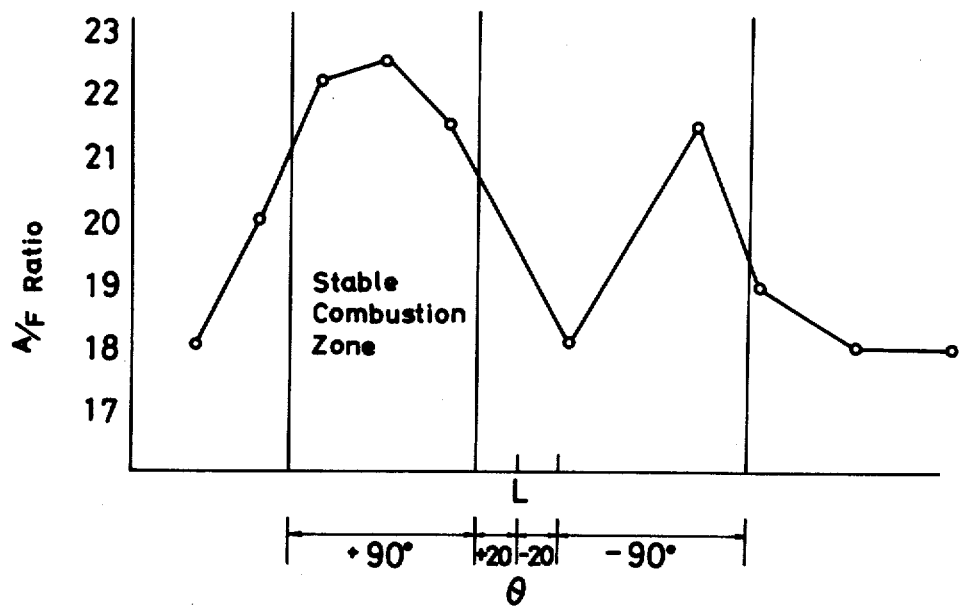
FIGS. 6, 7 and 9 are graphs illustrating the effects of the present invention.

Since the oriented direction of the injection nozzle portion 22a is set in the aforementioned manner, (according to the present invention, the intensity of the swirl generated becomes so high that the engine can be run with a far larger A/F ratio than the prior art even in case the EGR is performed at the same rate. This effect of the present invention is illustrated in FIG. 6. From this Figure, it will be understood that the lean combustion limit can be more effectively raised if the swirling direction is made such that the swirl flows into the exhaust port after it has swept the ignition plug 23.

Figure 8:
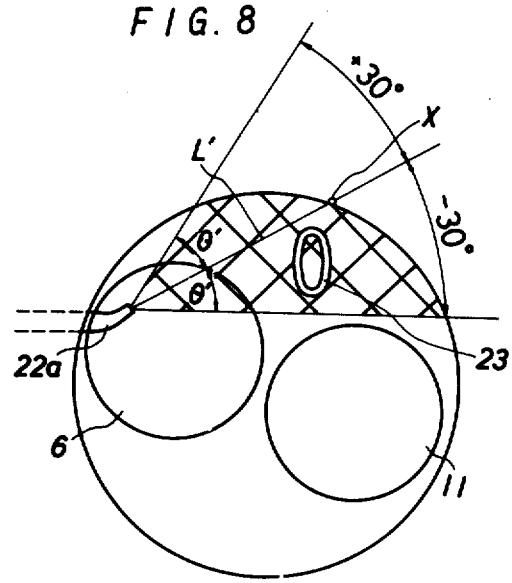
Figure 9:
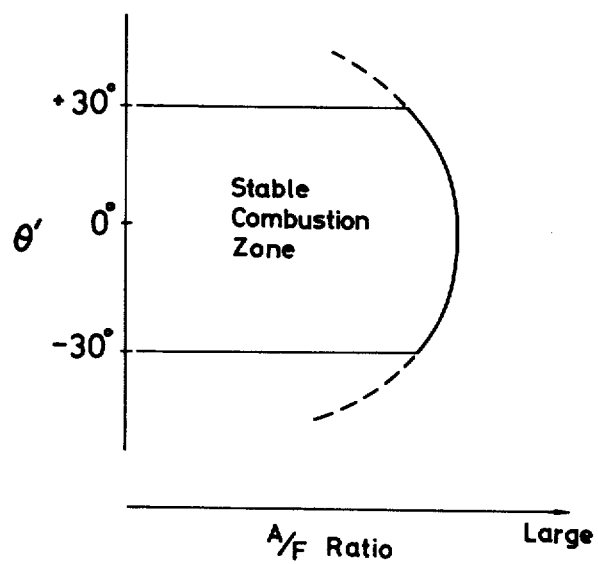

Moreover, it is preferable that the direction of the injection nozzle portion 22a is set in the following manner. With reference to FIG. 8, specifically, in the plane P normal to the axis of the cylinder 1, the wall portion of the cylinder, which is the nearest to the ignition plug 23, i.e., the point on the circle of the cylinder wall which is nearest to the ignition plug is denoted at X, and the line joining this nearest point and the injection end of the injection nozzle portion 22a is denoted at L'. Then, it is preferable that the direction of the injection nozzle portion 22a is set within a range of ±30 degrees with respect to the aforementioned joining line L'. This direction range is defined by an angle $\theta'$ and illustrated by a fretwork in FIG. 8. The resultant effect is illustrated in FIG. 9, from which it is understood that the oriented direction as shown in FIG. 8 is perferred for enhancement of the lean combustion limit.

Figure 7:
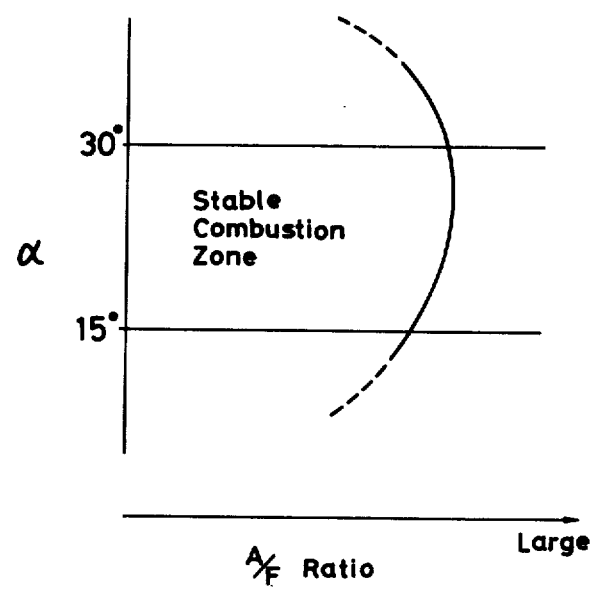

Moreover, the oriented direction of the injection nozzle portion 22a is also preferred to be set within a predetermined angular range with respect to the plane P normal to the axis of the cylinder 1. Reverting to FIG. 2, the oriented direction of the injection nozzle portion 22a is set within a range of an angle of 15 to 30 degrees toward the piston 3 with respect to the aforementioned plane P. Incidentally, this direction range is defined by an angle $\alpha$ in FIG. 2. The resultant effect is illustrated in FIG. 7.

Now, the concrete constructions for directing the injection nozzle portion 22a in the aforementioned manners will be described in detail in the following. According to one example, the pipe member 22A is constructed such that the injection nozzle portion 22a of the pipe member 22A is formed into a bent shape with respect to a bore portion 22b, as shown in FIG. 2. In this case, the bore portion 22b of the pipe member 22A can be extended in parallel with the plane P normal to the axis of the cylinder and at a right angle with respect to a crank-shaft (not shown) which extends at a right angle to the sheet drawing FIG. 2 with the advantageous result that the operation of boring the fitting hole 2a in the cylinder head 2 can be facilitated.

Figure 10:
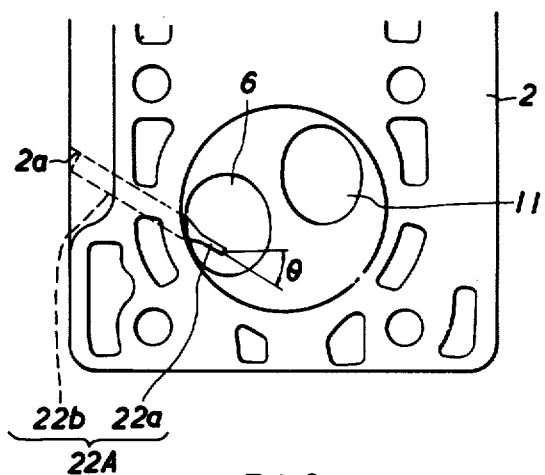
FIGS. 10 to 12 show another embodiment constructing the outlet end portion of a sub-suction path, FIG. 10 being a view showing the cylinder head, as viewed from the inside thereof, FIG. 11 being a view corresponding to FIG. 2, and FIG. 12 being a front elevation showing a pipe member.
Figure 11:
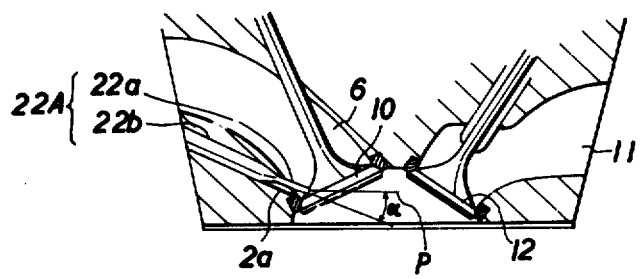
Figure 12:
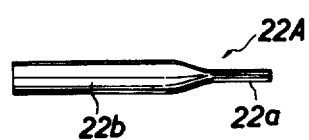

Still another example of the concrete constructions is shown in FIGS. 10 to 12. According to this example, the pipe member 22A is formed into a straight shape as a whole, i.e., formed such that the two portions 22a and 22b are made coaxial. In this case, the fitting hole 2a is bored in alignment with the oriented direction of the injection nozzle portion 22a. According to this example, the injection nozzle portion 22a can be oriented in any desired direction merely by forcing the pipe member 22A into the fitting hole 2a without considering the deviation in a circumferential direction of the pipe member 22A on the axis thereof.

As is now apparent from the description thus far made, according to the present invention, the lean combustion limit can be enhanced to highly contribute to the improvement in the rate of fuel consumption as well as the exhaust gas purification.

Figure 13:
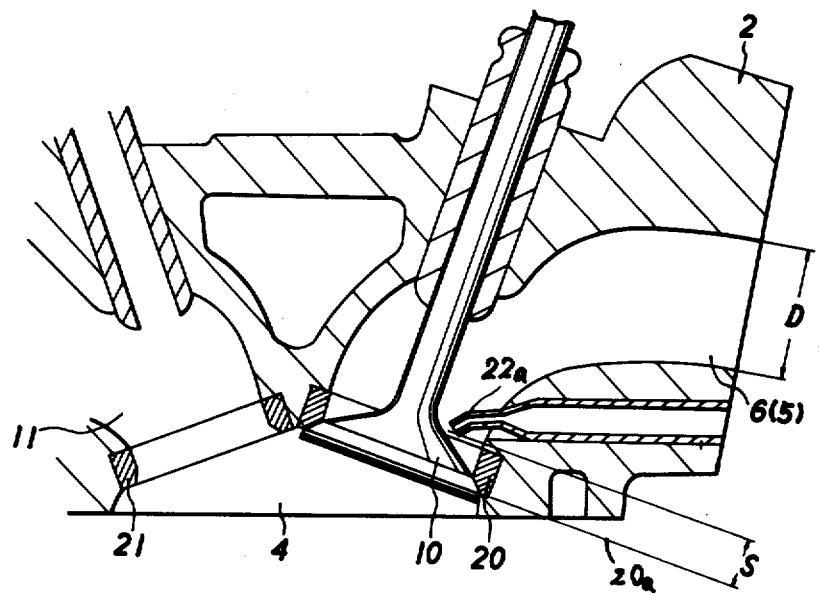
FIG. 13 is an enlarged sectional view showing an essential portion of still another embodiment of the present invention.
Figure 14:
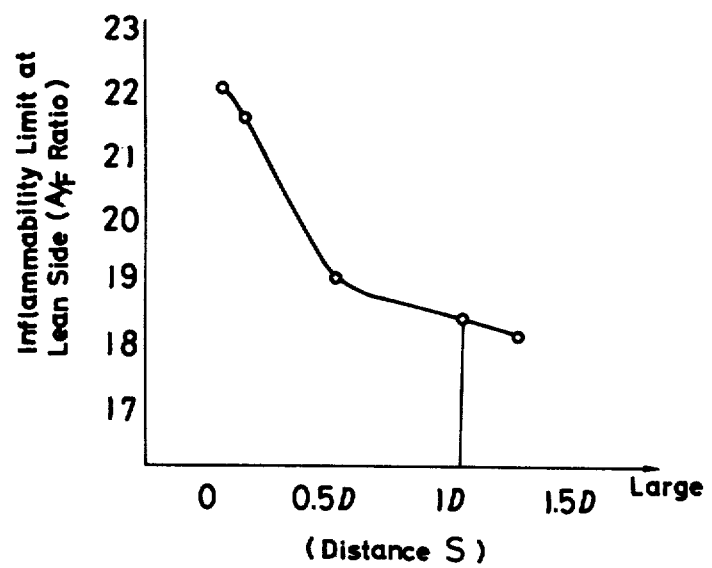
FIGS. 14 and 15 are graphs illustrating the effects of the internal combustion engine shown in FIG. 13.
Figure 15:
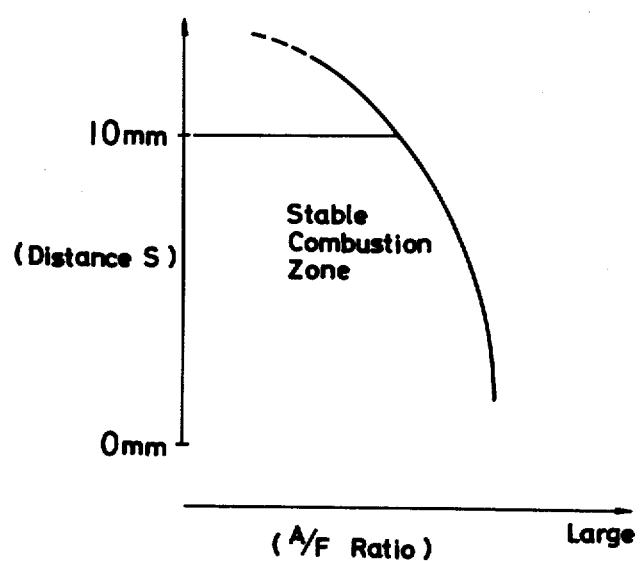

Next, another embodiment which has been made as a result of various investigations of the relationship between the position of the outlet end of the sub-suction path and the swirl of the suction gas generated, in which the outlet end of the sub-suction path is opened immediately upstream of the suction valve for opening or closing the main suction path and in which the distance between said outlet end and the face of the intake valve at its closed position is made not more than the internal diameter of the main suction path, will be described with reference to FIGS. 13 to 15.

In the present embodiment, the injection nozzle portion 22a constituting the outlet end portion of the sub-suction path 22 has a nozzle portion at an end thereof with a reduced diameter which is opened immediately upstream of the aforementioned suction valve 10. Moreover, the distance S (see FIG. 13) between the leading end of that injection nozzle portion 22a and the chamber side bottom face 20a of the suction valve seat 20 is made smaller than the internal diameter D of the suction port 6, preferably, 10 mm or less. Needless to say, the injection nozzle portion 22a is directed generally in the tangential direction of said cylinder 1 so as to generate the swirl of the suction gas on the axis of the cylinder 1 within the combustion chamber 4, and the swirling direction is set such that the suction gas flows into the exhaust port 11 after it has swept the ignition plug (not shown).

In the internal combustion engine having the construction thus far described, during the suction stroke with the suction valve 10 opened, the mixed gas is supplied to the combustion chamber 4 from the main suction path 5, whereas a gas is sucked into and injected from the sub-suction path 22. By the injection of the gas from the sub-suction path 22, the air-fuel mixture sucked into the combustion chamber 4 is swirled around the axis of the cylinder 1 so that the burning velocity is accelerated.

Here, in the present invention, since the aforementioned distance S is set at the aforementioned value, the generated swirl of the suction gas is intensified so that the lean combustion limit is enhanced, i.e., so that a stable combustion can be ensured at a higher air-fuel ratio than the prior art. These effects of the present invention are illustrated in FIGS. 14 and 15. FIGS. 14 and 15 are prepared at such an ignition timing as can generate the highest output power.

As is now apparent from the description thus far described, according to the present invention, the lean combustion limit can be enhanced to highly contribute to the improvement in the rate of fuel combustion as well as exhaust gas purification.

FIGS. 16 to 21 show still another embodiment of the present invention. This embodiment is characterized in that the outlet end of the aforementioned sub-suction path is positioned within a sphere with its center being the spark point the ignition plug and with the same diameter as the internal diameter of the cylinder, and within a range of ±1 mm from the plane which contains both the center line of the stem of the suction valve and such one of the contacts of tangency between the valve facing circle of the valve seat of the suction valve and the lines drawn from the spark point of the aforementioned ignition plug as is nearer to the wall of the cylinder.

Figure 16:
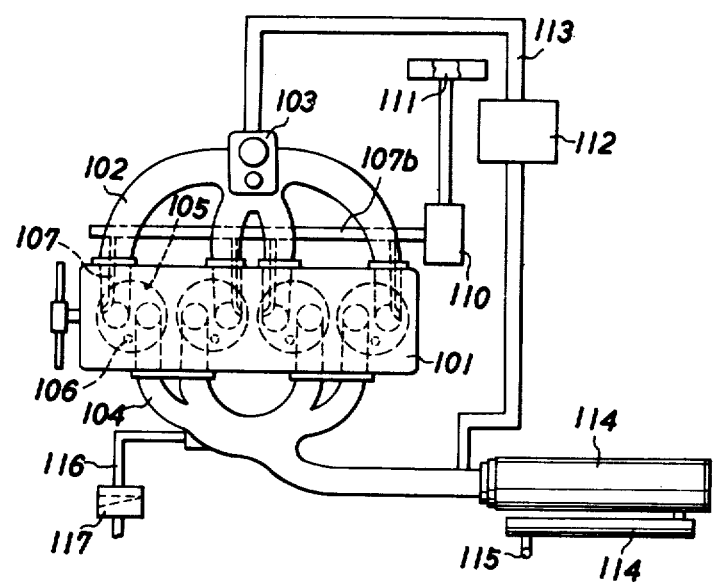
FIG. 16 is a schematic view showing an internal combustion engine according to still another embodiment of the present invention.

Now, referring to FIG. 16, reference numeral 101 indicates a four-cycle engine. Numeral 102 indicates a main conduit acting as the suction path. Numerals 103 and 104 indicate a carburetor and an exhaust path. Numeral 105 indicates a cylinder, into which the leading ends of the main suction path 102 and the exhaust path 104 are opened. Numeral 106 indicates an ignition plug. Into the suction port of the cylinder 105, there is opened an sub-suction path 107 which is provided separately of the main suction path 102.

Figure 17:
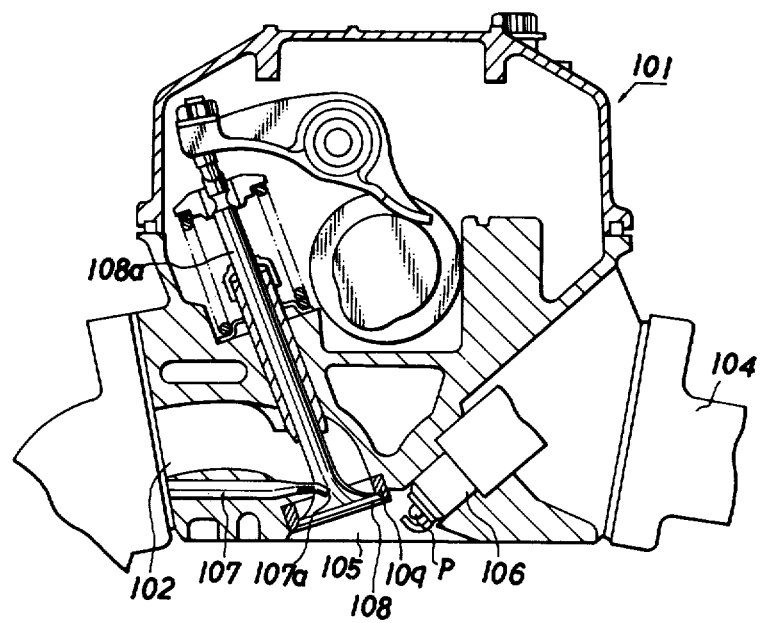
FIG. 17 is longitudinal section showing an essential portion of the internal combustion engine in FIG. 16.
Figure 18:
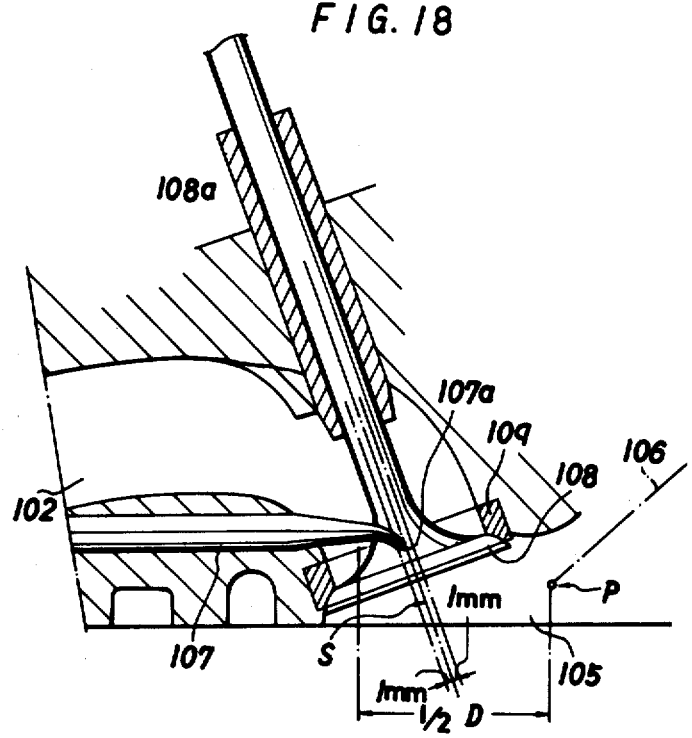
FIG. 18 is an enlarged longitudinal section showing the positional relationship between a sub-suction path and a spark point of an ignition plug shown in FIG. 17.
Figure 19:
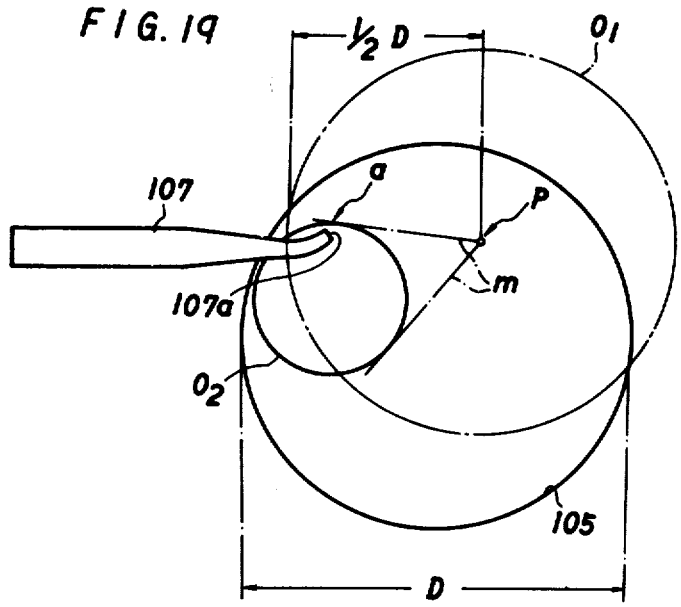
FIG. 19 is a top plan view showing the positional relationship between the sub-suction path and an cylinder shown in FIG. 18.

That sub-suction path 107 has its opened end 107a positioned just upstream of a valve 108, as shown in FIG. 17, and oriented in the tangential direction of the wall of the cylinder 105, as shown in FIG. 19. The positioning of the opened end 107a of the sub-suction path 107 will be detailed by way of example with reference to FIGS. 18 and 19. The opened end 107a is positioned within a sphere $0_1$ with its center being the spark point P (which is indicated by a small circle in FIGS. 18 and 19) of the ignition plug 106 and with the same diameter as the internal diameter D of the cylinder, and in a space within a range of ±1 mm from the plane S which contains both the center line of a valve stem 108a and such one of the contacts of tangency, a, between the valve facing circle $0_2$ of a valve seat 109 and the lines, m, drawn from the spark point P of the ignition plug 106 as is nearer to the cylinder wall.

In fact, the sub-suction path 107 are provided commonly for the four cylinders 105 and are connected with an air cleaner 111 via a confluent pipe 107b and an air flow control device 110. With the main suction path 102, on the other hand, there is connected the base end of an exhaust gas recirculation path 113 which in turn is connected at its leading end with the exhaust pipe 104 and at its midway with a controller 112 for controlling the exhaust gas recirculation rate. Numerals 114 and 115 indicate a silencer and a tail pipe, respectively.

A conduit 116 is connected with the exhaust pipe 104 so that a secondary air is supplied therethrough to the exhaust system. That conduit 116 is equipped at its midway with a reed valve 117, which is opened or closed by the use of the pulsations in the exhaust pressure so that the secondary air may be efficiently introduced into the exhaust pipe 104. The supply of the secondary air may be alternatively introduced by an air pump in place of the read valve.

The internal combustion engine thus constructed according to the present invention operates in the following manners. Specifically, since the sub-suction paths 107 are connected with the air cleaner 111 through the confluent path and the air flow control device 110 to be opened into the atomosphere, a high pressure difference is established during the suction stroke. As a result, under a light load conditions in which the properties of the air-fuel mixture are expecially deteriorated to degrade the combustion, the air is injected at a high speed from the sub-suction path 107 with a similar effect to that which could be obtained if the confluent path 107b were connected with a high pressure source.

During an ordinal running operation, the flow rate of the mixture required to be supplied from the carburetor 103 via the main suction path to the cylinder 105 is one third of that during the full output at the most. Thus, the opening of the throttle valve of the carburetor 103 is considerably small. As a result, the pressure prevailing in the main suction path 102 is remarkably lowered to about one half of the atmosphere pressure. Consequently, the flow speed of the air injected from the corresponding sub-suction path 107 is as high as a sonic level. The jet thus injected at that high speed generates an intense swirl in that cylinder 105.

During the idling operation of the engine 101, to the contrary, since the engine 101 performs no work to the outside, the flow rate of the mixture becomes so low that the pressure in the main suction path 102 becomes far lower than the atmospheric pressure. Therefore, unless the air flow rate is adjusted to the optimum level by means of the air flow control device 110, the proper mixture cannot be supplied so that the fuel consumption rate is augmented. This fuel consumption rate is decreased by properly adjusting the air-fuel ratio to the theoretical A/F ratio.

The exhaust gas is partially recirculated to the main suction path 102 in accordance with the control of the controller 112 which is disposed in the EGR path 113. The combustion gas containing hydrocarbons HC and carbon monoxide CO is exhausted from the exhaust path 104 to the outside after it has cleared of the HC and CO by the action of an oxidizing catalyst which is mounted in the silencer 114. The air which may become more or less short for the oxidization of the exhaust gas is supplied from the conduit 116.

Since, in the present invention, the suction gas flow is charged into the tangential flow of the cylinder 105 by the action of the sub-suction path 107 and since the opened end 107d of the sub-suction path 107 is so positioned that the tangential flow may give the largest effect, an intense swirl is generated in the cylinder 105 during the suction stroke of the engine 101 thereby to establish a vortex state. Although that swirl is weakened during the compression stroke, such extremely fine turbulences as ensure the combustion can be maintained until the ignition. Thanks to these turbulences, the burning velocity of the mixture is accelerated to remarkably shorten the combustion time so that the stable combustion can be retained even under the much exhaust gas recirculation. Moreover, the engine can be run even in the lean range of the mixture.

The influences of the turbulences upon the combustion play a remarkably important role. In the existing engine, more specifically, the exhaust gas recirculation ratio allowed is about 10% at most, and the misfire takes place, if the EGR ratio exceeds 10%, so that the stable combustion cannot be sustained any more. In other words, if the exhaust gas recirculation ratio is excessively enlarged, the burning velocity is decelerated so that an mis-firing is invited or so that the stable combustion cannot be maintained.

To the contrary, if the swirl is so intensified as to augment the turbulences, a stable combustion can be maintained even for the much exhaust gas recirculation. Thus, since the emission of the $NO_X$ can be notably reduced, as compared with the prior art, the engine can be run at such an air-fuel ratio as to invite the most $NO_X$ emission and at the most proper burning timing (MBT). As a result, the fuel consumption rate of the engine can be remarkably improved, as compared with the combustion system according to the prior art.

Figure 20:
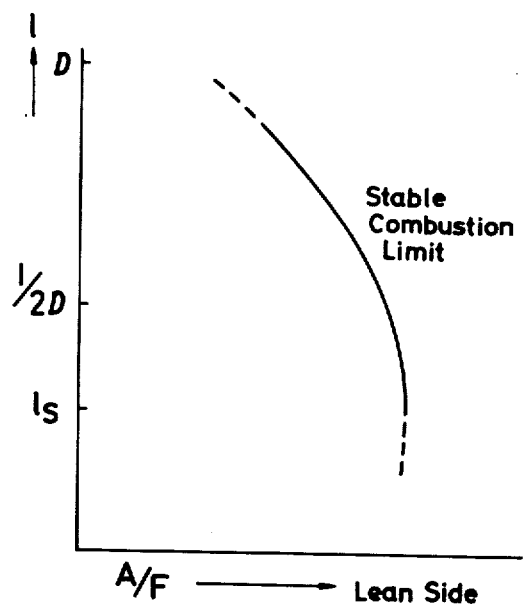
FIG. 20 is a graph illustrating the relationship between an air-fuel (A/F) ratio within the stable combustion limit of the internal combustion engine according to the present invention and a distance l.
Figure 21:
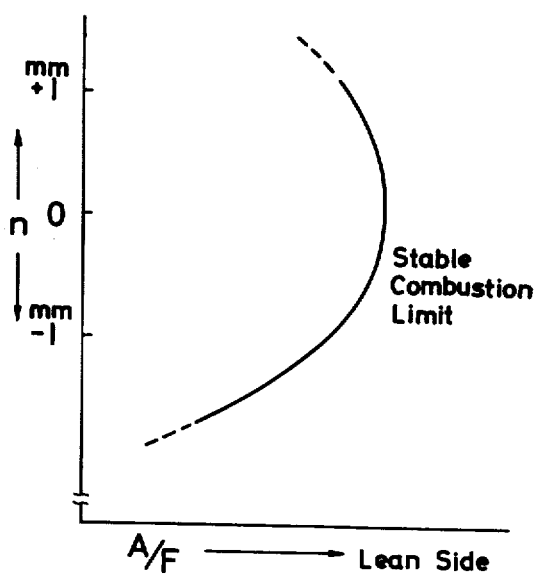
FIG. 21 is a graph illustrating the relationship between the air-fuel (A/F) ratio within the stable combustion limit of the internal combustion engine according to the present invention and a distance n.

This result is graphically illustrated in FIGS. 20 and 21 on the conditions that the r.p.m. of the engine is within most of the range for the street running operation, the ignition timing is the highest output power producing timing, and the load is within the range for the street running operation.

FIG. 20 illustrates the relationship in the stable combustion limit between the distance l (the ordinate) from the spark point P of the ignition plug to the opened end 107a of the sub-suction path 107 and the air-fuel (A/F) ratio (the abscissa). According to FIG. 20, the air-fuel (A/F) ratio is shifted to the leaner side as the distance l approaches $\frac{1}{2}$ D from D, and the air-fuel (A/F) ratio is held almost constant from $\frac{1}{2}$ D to a distance $l_s$, which is measured to the plane S containing the center line of the valve stem 108a as shown in FIG. 18. According to the present invention in which the opened end 107a is set at the aforementioned position, therefore, the engine can be run at a learner side of the air-fuel ratio so that the fuel consumption rate can be improved to a high level.

If the distance l becomes longer than $\frac{1}{2}$ D, to the contrary, the sweeping action of the ignition plug is so deteriorated that the ignition delay is augmented to elongate the burning time thereby to deteriorate the lean combustion limit. This is caused by the diffusion of the jet.

FIG. 21 illustrates the relationship in the stable combustion limit between the distance n (in ordinance) measured from the plane S containing the center line of the valve stem 108a in FIG. 18 to the opened end 107a of the sub-suction path 107 wherein the plane S is taken as "0", the side on which the ignition plug 106 is located is taken as "plus" and the side on which the ignition plug is not located is taken as "minus", and the air-fuel (A/F) ratio (in the abscissa).

It is judged that the nearer the position of the opened end 107a of the sub-suction path 107 is the inside of the combustion chamber, the more effective is the sub-suction path for producing the swirl. However, at the plus side where that opened end is near the combustion chamber and it is apart more than 1 mm from the reference plane S ("0"), the jet will impinge upon the valve seat 109 so that it diffuses. To the contrary, at the minus side where that opened end is apart more than 1 mm from the reference plane S, the jet will diffuse, before the jet passes through the clearance between the valve and the valve seat 109, so that the swirl is weakened. As a result, the stable combustion limit cannot be attained at the air-fuel (A/F) ratio of a lean side. To the contrary, since the swirl to be generated by the jet is intense with the position of the opened end 107a of the sub-suction being located according to the present invention, the burning velocity is so accelerated that the engine can be run at the air-fuel (A/F) ratio of a lean side.

Here, it has been experimentally confirmed that the swirl in the cylinder 105 is intensified as the flow rate of the fluid to be supplied from the sub-suction path 107 is increased. Nevertheless, since the flow rate of the mixed gas is low under the idling condition of the engine 101 where the suction pressure is low, the air flow rate is suppressed to a relatively low level under the idling operation by means of the air flow control device 110 so that a misfiring can be avoided.

Since the present embodiment is constructed in the aforementioned manners, the burning velocity of the mixed gas can be accelerated to shorten the burning time so that the lean combustion limit can be improved to perform the exhaust gas recirculation at a high rate, whereby it is possible to reduce the noxious content of the $NO_x$ and to improve the fuel consumption rate.

What is claimed is:

1. In an internal combustion engine:
    a combustion chamber defined by a cylinder, a cylinder head and a piston fitting in said cylinder;
    a main suction path having a suction port formed in said cylinder head and adapted to be opened and closed by a suction valve at the open end portion of said suction port which is opened into said combustion chamber;
    a sub-suction path, at least partially formed by a straight bore through the cylinder head, provided separately of said main suction path and having its outlet end opened immediately upstream of said suction path;
    an exhaust port disposed opposite the suction port, and
    an ignition plug disposed between the suction and exhaust ports, wherein a swirling direction of gas injection from said sub-suction path into said combustion chamber is directed such that a flow is toward the exhaust port after it has swept past the ignition plug;
    wherein the improvement resides in that a direction in which the outlet end of said sub-suction path opens is within a range of about 30 degrees with respect to a plane extending normal to the axis of the cylinder, the plane including a line joining a point nearest on the wall of said cylinder from the ignition plug and the center of said sub-suction port; wherein the direction is also at angle of 15 to 30 degrees from a plane normal to the axis of the cylinder; and wherein an outlet end portion is a pipe, press-fitted into the bore in the cylinder head and having its leading end protruding into the suction port, the leading end being bent with respect to the bore in the cylinder head and the internal diameter of the leading end portion being of a reduced diameter with respect to the remainder of the pipe
    wherein the outlet end portion is slightly laterally bent.

* * * * *